United States Patent [19]

Hofmeister

[11] Patent Number: 4,826,692

[45] Date of Patent: May 2, 1989

[54] METHOD OF PRODUCING LEAN MEAT

[75] Inventor: Dennis D. Hofmeister, Ackley, Iowa

[73] Assignee: Lean & Free Products, Inc., Ackley, Iowa

[21] Appl. No.: 130,330

[22] Filed: Dec. 8, 1987

[51] Int. Cl.$^4$ ................................................ A23K 1/00
[52] U.S. Cl. ........................................ 426/2; 426/623; 426/630; 426/636; 426/807
[58] Field of Search ................. 426/2, 623, 63 U, 636, 426/807

[56] References Cited

U.S. PATENT DOCUMENTS

| | | | |
|---|---|---|---|
| 3,932,670 | 1/1976 | Sakurai | 426/2 |
| 4,073,960 | 2/1978 | Scott et al. | 426/2 |
| 4,132,808 | 1/1979 | Kakade | 426/2 |
| 4,673,576 | 6/1987 | D'Aiello | 426/2 |

OTHER PUBLICATIONS

Hackh's Chemical Dictionary, Fourth Edition, Julius Grant, p. 621.
National Live Stock and Meat Board, Research/Nutrition Information Department, "Food and Nutrition" News, Mar./Apr. 1987; vol. 59, No. 2, pp. 43, 48, 53.
Journal of Animal Science, vol. 55, No. 4, 1982, S. C. Seideman et al., "Utilization of the Intact Male for Red Meat Production: A Review", pp. 826–840.

*Primary Examiner*—R. B. Penland
*Attorney, Agent, or Firm*—Henderson & Sturm

[57] ABSTRACT

A method of producing lean meat having a low dietary fat and cholesterol content. An intact male ruminant is selected at an age before development of the rumen and fed a low-fat, high fiber ration. The intact male is then slaughtered at an age before development into an adult animal.

1 Claim, No Drawings

METHOD OF PRODUCING LEAN MEAT

TECHNICAL FIELD

This invention relates to a method of producing lean meat, and more particularly to a method of specialized feeding and slaughtering.

BACKGROUND ART

Various methods of cattle lot feedings are well known in the prior art. Cattle feeding lots are abundant and many experience conditions of overcrowding. Cattle are often times fed a high fat diet for a fast weight gain in as short a period as possible so that the animal can be sent to market after reaching a desirable market weight. The meat from such animals tends to be fatty. Animal feed lots sometimes also inject their animals with hormones or steroids or even chemicals to achieve a weight gain in the shortest time possible to make the operation more profitable. It is well known today that fatty meats are not good for consumption because of high cholesterol levels and caloric levels. Also, some chemicals that have been injected into animals have been shown to have adverse reactions on the consumer.

Those concerned with these and other problems recognize the need for an improved method of producing a lean meat.

DISCLOSURE OF THE INVENTION

The present invention provides a method of producing lean meat having a low dietary fat and cholesterol content. An intact male ruminant is selected at an age before development of the rumen and fed a low-fat, high fiber ration. The intact male is then slaughtered at an age before development into an adult animal.

An object of the present invention is the provision of an improved lean meat product having fewer calories, less fat and cholesterol than most poultry or fish.

Another object is to provide an improved lean meat product having fewer calories, less fat and cholesterol than choice beef.

A further object of the invention is the provision of a lean meat product having fewer calories, less fat and cholesterol than other lean beef products.

Still another object is to provide a lean meat product free of potentially harmful residual hormones or steroids.

A still further object of the present invention is the provision of a lean meat product that is free of potentially harmful residual antibiotics and chemicals.

Still another object of the present invention is to provide a lean meat product that is free of additives and preservatives.

A further object of the present invention is to provide a lean meat product that comes from a young animal.

Still another object of the present invention is to provide a lean meat product that contains less fat than conventionally raised meat and cooks in less time.

These and other attributes of the invention will become more clear upon a thorough study of the following description of the best mode for carrying out the invention, particularly when reviewed in conjunction with the example.

BEST MODE FOR CARRYING OUT THE INVENTION

The following example is illustrative of the best mode for carrying out the invention. It is obviously not to be construed as limitative of the invention since various other embodiments can readily be evolved in view of the teachings provided herein.

EXAMPLE 1

Twenty-one head of Holstein dairy bull calves were ear-tagged, recorded and genetic identification was made at no later than two weeks of age. The intact bull calves were started on feed at twelve weeks of age which is when rumen development allows the animal to efficiently utilize a high fiber ration.

All cattle were fed free choice, a specialized cooked barley ration produced by a friction-pressure process that gelatinizes the barley starch so that the entire feed ration can be better utilized in the gut, which is necessary because of the extremely high fiber, low fat characteristics of the animals' total diet. Ground-friction pressure processed cooked soybeans were incorporated into the ration to enhance the protein level. This cooked high fiber cereal grain portion of the ration included ground barley, soybean meal, heat processed ground extruded whole soybeans, calcium carbonate, monocalcium dicalcium phosphate, potassium chloride, salt, magnesium oxide, sodium sulfate, sodium bicarbonate, magnesium sulfate, potassium sulfate, sulfur, manganese sulfate, copper sulfate, iron sulfate, zinc sulfate, cobalt carbonate, ethylenediamine dihydroiodide, silicon dioxide, sodium sulfite (a preservative), iron oxide, zinc oxide, sodium selenite, vitamin A supplement, D-activated animal sterol (source of Vitamin $D_3$) and mineral oil.

The analysis of this portion of the ration was as follows:

| | |
|---|---|
| Crude protein | not less than 12.00% |
| Crude fat | not less than 2.25% |
| Crude fiber | not more than 5.00% |
| Calcium (Ca) | not more than 1.10% |
| | not less than 0.50% |
| Phosphorus (P) | not less than 0.55% |
| Potassium (K) | not less than 0.65% |
| Magnesium (Mg) | not less than 0.25% |
| Salt (NaCl) | not more than 0.70% |
| | not less than 0.50% |
| Vitamin A, U.S.P. Units/Lb. | not less than 7,000 |
| Vitamin $D_3$ | not less than 1,000 |
| Vitamin E, I.U. Per Lb. | not less than 25 |
| Selenium | not less than 0.00001% |

This portion of the ration was the sole grain portion of the animals' diet.

S-F Plus, a probiotic product that contains a high level of *Streptococcus faecium*, a lactic acid producing organism was sprayed on the free choice, cooked, ration combination for maximum digestion and protein metabolization. This product provides the necessary balance of microbial digestive bacteria to stabilize the pH of the intestine and promote maximum feed efficiency and rate of gain.

OCM was fed free choice to all cattle. OCM is a non-medicated mineral, sodium sulfate decahydrate that helps maintain physiological functions of the intestinal tract. OCM stimulates the peristaltic action of the intestinal muscles and cleanses the intestinal walls to aid absorption of nutrients through digestive enzyme action on available protein, vitamins, and minerals. A salt block was made available free choice during the entire feeding period.

All cattle were fed oat straw free choice for the entire feeding period. Oat, rye, wheat, or barley straw is acceptable. The straw can be harvested or have grain remaining on the stem. Straw was fed to meet the requirements for an extremely high fiber ration. No green forage was fed.

Fresh clean water was provided at all times. The water had low nitrate levels and no fecal bacteria count. Bedding was provided and included corn cobs covered with straw, wood shavings covered with straw, baled corn stalks, and baled straw.

Megadosage of *Streptococcus faecium* paste was provided to stimulate digestion of sick animals. Therapeutic doses of antibiotics were administered to sick animals. Records of all shots were kept on each animal. No subtherapeutic levels of any drugs were fed. No drugs of any kind were administered to the cattle within one hundred twenty days of slaughter.

For maximum comfort, sixty square feet of space was made available to each animal under roof, or outside. Draft-free space was provided under the roof. For maximum comfort, weight gain and feed efficiency, no more than twenty-five intact bulls were allowed per pen. All cattle were raised in the optimum of clean conditions.

All cattle were weighed periodically during the feeding period to monitor growth rate, feed efficiency and cost of gain.

The cattle were slaughtered at no more than eleven months of age at government inspected sights. Five head were slaughtered at about forty-four weeks of age, five head at about forty-five weeks of age, five head at about forty-eight weeks of age, and six head at about forty-nine weeks of age. All slaughtering facilities conformed to rigid cutting and packaging specifications.

In the beef processed from the animals, the cholesterol content averaged below 51 mg. per 3 ounce portion raw, the fat content averaged between 0.97 percent and 9 percent of any specific cut, and the calories averaged between eighty and one hundred twenty per three ounce portion raw.

The method of this invention produced the leanest possible beef products. Tests conducted by independent laboratories have shown these beef products to be lower in calories, fat and cholesterol than choice beef and other lean beef products.

While only certain preferred embodiments of this invention have been shown and described by way of illustration, many modifications will occur to those skilled in the art and it is, therefore, desired that it be understood that it is intended herein to cover all such modifications that fall within the true spirit and scope of this invention.

I claim:

1. A method of producing lean beef, consisting essentially of the steps of:

selecting intact male Holstein dairy calves at an age of about two weeks which is before the development of the rumen;

starting said intact males on feed at an age of about twelve weeks which is when rumen development allows efficient utilization of a high fiber ration;

feeding said intact males free choice a ration comprising a first low-fat portion and a second high fiber portion, said first low-fat portion including cooked barley produced by a friction-pressure process that gelatinizes the barley starch, cooked soybeans, minerals, trace elements, vitamins, Streptococcus faecium, and sodium sulfate decahydrate, said first low-fat portion comprising:

| | |
|---|---|
| Crude protein | about 12.00% |
| Crude fat | about 2.25% |
| Crude fiber | about 5.00% |
| Calcium (Ca) | about 0.80% |
| Phosphorus (P) | about 0.55 |
| Potassium (K) | about 0.65% |
| Magnesium (Mg) | about 0.25% |
| Salt (NaCl) | about 0.60% |
| Vitamin A, U.S.P. Units/Lb. | about 7,000 |
| Vitamin $D_3$ | about 1,000 |
| Vitamin E, I.U. Per Lb. | about 25 |
| Selenium | about 0.00001% | said second high fiber portion including a cereal grain straw selected from the group consisting of oat straw, rye straw, wheat straw, and barley straw;

providing said intact males a supply of fresh clean water;

providing said intact males at least about sixty square feet of space each; and slaughtering said intact at an age of about eleven months which is before the development into an adult animal.

* * * * *